INVENTOR
André MOTTU
By John B. ...
Attorney

July 28, 1964  A. H. MOTTU  3,142,120
MEASURING MACHINE OR PRECISION MACHINE TOOL
Filed Sept. 20, 1962  4 Sheets-Sheet 2

INVENTOR
André MOTTU
By John B. Armentrout
Attorney

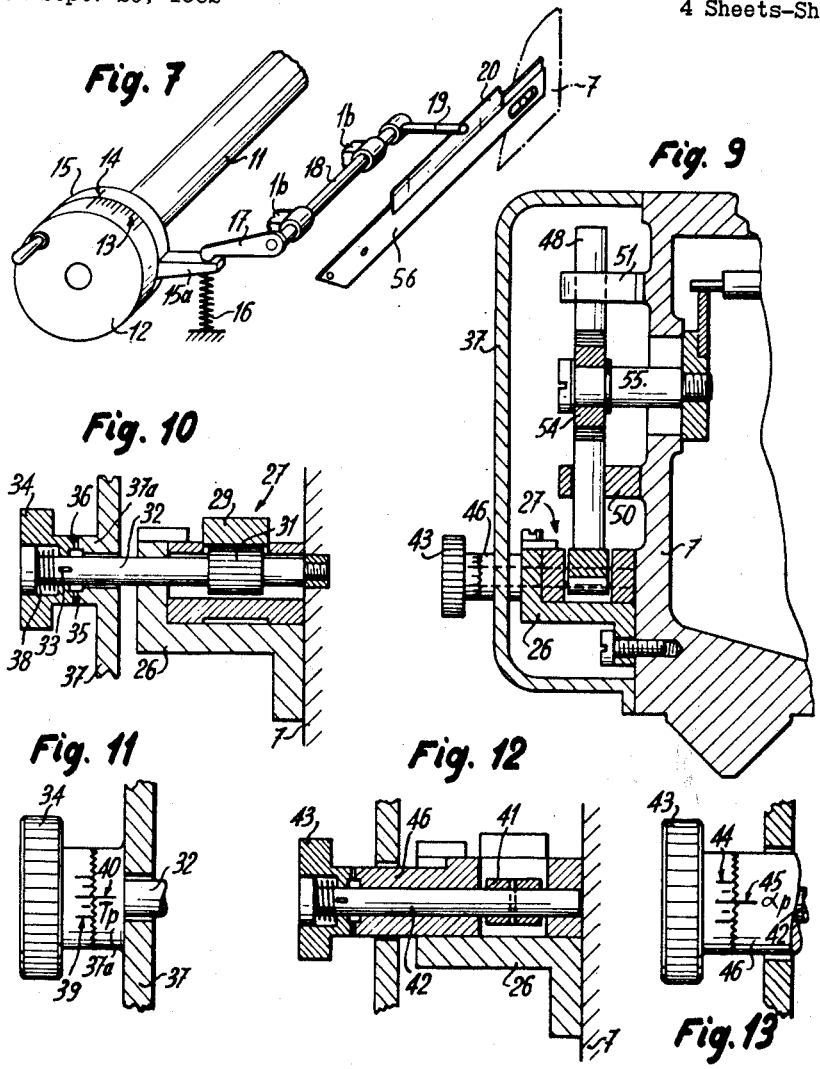
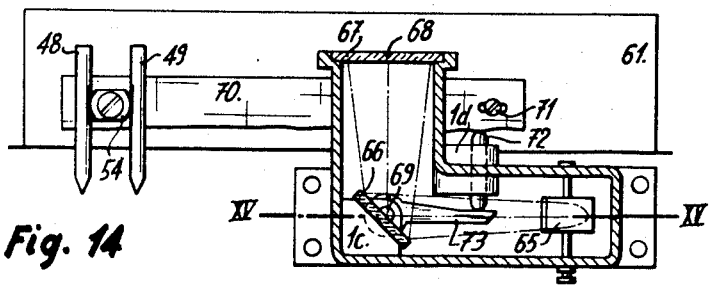

July 28, 1964  A. H. MOTTU  3,142,120
MEASURING MACHINE OR PRECISION MACHINE TOOL
Filed Sept. 20, 1962  4 Sheets-Sheet 4
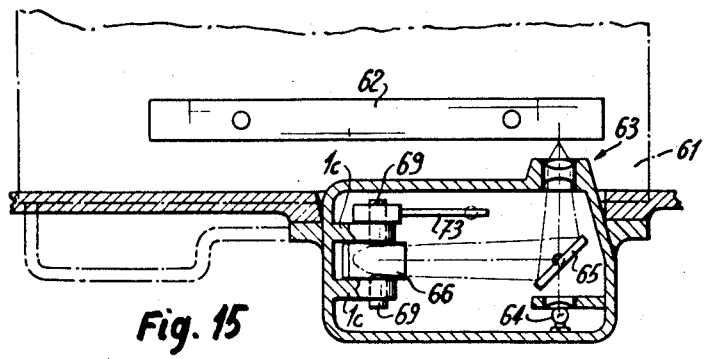
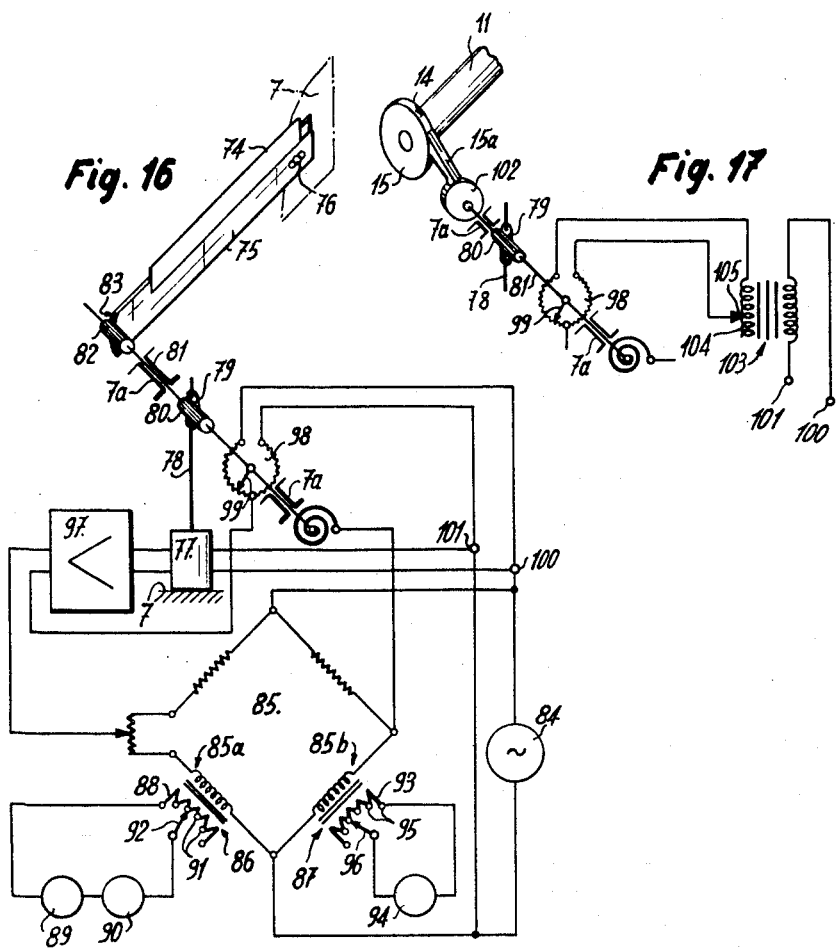
INVENTOR
André MOTTU
By John C. ...
Attorney United States Patent Office 3,142,120
Patented July 28, 1964

3,142,120
MEASURING MACHINE OR PRECISION
MACHINE TOOL
André H. Mottu, Geneva, Switzerland, assignor to Societe Genevoise d'Instruments de Physique, Geneva, Switzerland
Filed Sept. 20, 1962, Ser. No. 224,921
Claims priority, application Switzerland Sept. 30, 1961
14 Claims. (Cl. 33—125)

This invention relates to a measuring machine or a precision machine tool comprising at least one movable element which may be a workpiece holder, a feeler holder, or tool holder, and at least one device for linear measurement of the positions occupied by the movable element along its path, by means of a linear reference element serving as a standard.

It is known that the materials used in industry have different coefficients of thermal expansion. Only some of them, particularly Invar, undergo very small or zero thermal expansion when their temperature varies. For this reason, the General Weights and Measures Conference of 1926 decided that the measurement of the geometric dimensions of parts should be carried out at a given temperature, known as the reference temperature, which was selected as being 20° C.

In industry, precise measurements should therefore be carried out at this temperature, although this gives rise to a number of considerable difficulties:

(1) It is difficult to maintain a constant temperature with precision in premises of a given volume.

(2) The machining of workpieces by chip removal gives rise to heating which makes it difficult to keep their temperature constant.

(3) Machine tools are affected by distortions originating from the heating of the driving elements.

(4) Unless special precautions are taken, handling of the workpieces tends to result in their heating.

(5) The influence of the heat evolved by the operator cannot be ignored.

Moreover, requirements in respect of precision are increasing and there is a tendency to use lightweight or heavy materials, the coefficients of expansion of which differ from those used in the construction of the machine and its measuring elements. The temperature of operation of the workpiece may also be very different from the reference temperature, for example in the case of gas or steam turbine blades, and this necessitates transposition of the dimensions during machining or checking.

From the foregoing it is apparent that measurement or machining inaccuracies occur owing to the differences between the temperatures of the workpieces or standard parts and the reference temperature.

To minimize these drawbacks, machine tool designers, for example, recommend that precision workpieces should be machined in a plurality of operations, of which the last the finishing operation—should be carried out only after a number of hours waiting time so as to enable the part to reach the reference temperature. The same applies to accurate measurements, which may be made only after prolonged waiting time in the measuring room, the latter generally being kept at a temperature close to the reference temperature so as to ensure that the temperatures of the measuring machine and of the workpiece to be measured are equal.

These waiting times have an exponential rate and become very considerable (12 hours and longer) in the case of long parts or parts which have to be measured with high accuracy. It is obvious that they cannot always be observed and that they always slow down production and checking.

The object of the present invention is to obviate these disadvantages.

The measuring machine or the machine tool according to the invention is characterized in that it comprises at least two temperature detectors intended to give information concerning the temperatures of the workpiece being measured or worked and of the standard respectively, and a differential device controlled on the one hand by the information furnished by the workpiece detector and on the other hand by the information furnished by the standard detector, means being provided so that the said differential device may act, in dependence on the coefficients of thermal expansion of the workpiece and the standard, to control an element of the measuring device and move it in such manner that the indications given by said measuring device correspond at all times to the real values of the dimensions of the part to be measured or the movements of the movable element, reduced to the reference temperature, even when the temperatures of the workpiece and of the standard differ therefrom.

The drawing illustrates a number of embodiments of the subject of the invention by way of example.

FIGS. 1 and 2 diagrammatically illustrate a part to be measured and a measuring standard respectively, both at the reference temperature;

FIGS. 3 and 4 diagrammatically illustrate the part to be measured and the measuring standard respectively at temperatures which are different from the reference temperature and different from one another;

FIG. 7 is a diagrammatic perspective of a detail of this machine;

FIG. 9 is a section on the line IX—IX in FIG. 8;

FIG. 10 is a section on the line X—X in FIG. 8;

FIG. 11 is a plan view in partial section of a detail of FIG. 10;

FIG. 12 is a section on the line XII—XII in FIG. 8;

FIG. 13 is a plan view in partial section of a detail of FIG. 12;

FIG. 14 is a vertical section of a detail of a measuring machine;

FIG. 15 is a section on the line XV—XV in FIG. 14;

FIG. 16 is the electrical circuit diagram for the control of the machine in which the compensation of temperature variations is automatic; and FIG. 17 is a detail of a variant of this machine.

Figure 1:
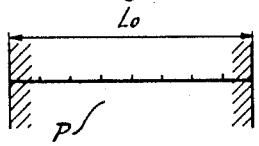
Figure 2:
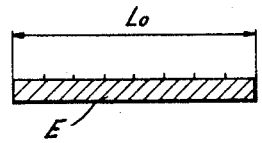

The workpiece P, which is shown in FIG. 1 at the reference temperature $Tr$, i.e., 20° C., has length $Lo$; the standard E, which is also shown at the reference temperature $Tr$ in FIG. 2, has a length $Lo$ equal to the length of the part P.

Figure 3:
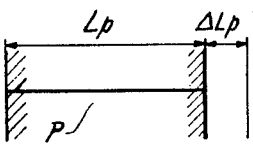

FIG. 3 shows the part P at a temperature $Tp$ less than the reference temperature $Tr$. The part P having a known coefficient of thermal expansion denoted by $ap$, its length $Lp$ at the temperature $Tp$ differs from the length $Lo$ by a value $\Delta Lp = Lo\, ap(Tr - Tp)$.

Figure 4:
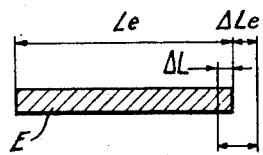

FIG. 4 shows the standard E at a temperature $Te$ below the reference temperature $Tr$. The standard E has a known coefficient of thermal expansion denoted by reference $ae$. Its length $Le$ at the temperature $Te$ differs from $Lo$ by the value $\Delta Le = Lo\, ae(Tr - Te)$.

It follows that if the part P is measured at the temperature $Tp$ by means of the standard E at the temperature $Te$, the length will be equal to: $Lo - (\Delta Lp - \Delta Le)$. This length does not correspond to the real length of the part at the temperature $Tp$ or at the temperature $Tr$. To measure the length of the part at the temperature $Tp$ with the standard at the temperature $Te$, and for the result to correspond to that of the measurement made at the temperature $Tr$, it is necessary to compensate the reading on the standard by the value:

$$\Delta L=(\Delta Lp-Le)$$

i.e.:

$$\Delta L=Lo[ap(Tr-Tp)-ae(Tr-Te)]$$

Since $Tr=20°$ C., $$\Delta L=Lo[ap(20-Tp)-ae(20-Te)]$$

The ideal case of measurement which is rarely encountered in practice is obtained when the workpiece and the standard have the same coefficient of thermal expansion and when they are at the same temperature. In that case, the compensation device is inoperative. The same applies if the temperature $Tp$ and $Te$ are exactly 20° C. irrespective of the coefficients of thermal expansion of the workpiece and the standard.

There are two important special cases:

(1) When $ap=ae$. The value $\Delta L$ then becomes:

$$\Delta L=Loae(Te-Tp)$$

(2) When $Tp=Te$. The value $\Delta L$ then becomes:

$$\Delta L=Lo(ap-ae)(20-Te)$$

Figure 5:
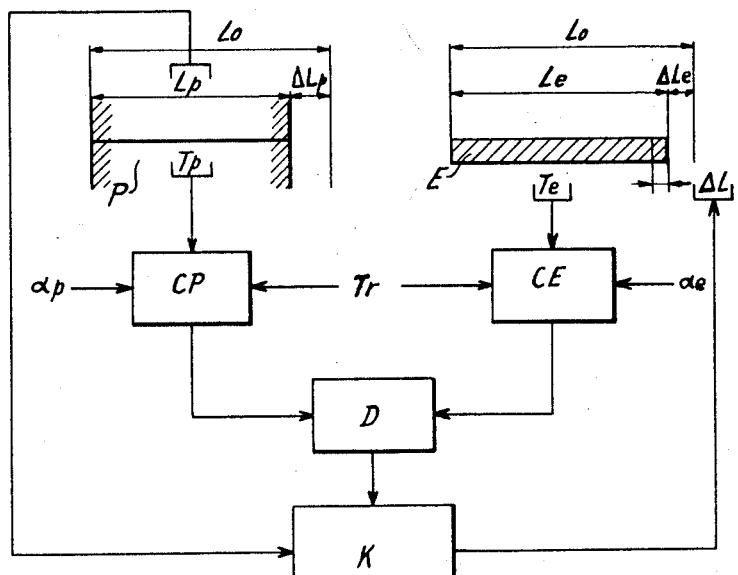
FIGURE 5 is a schematic diagram of the operation of the machine according to the invention.

The principle of operation of the machine according to the invention is diagrammatically illustrated in FIG. 5:

The workpiece P and the standard E are respectively shown at the temperature $Tp$ and $Te$, their lengths respectively being $Lp$ and $Le$. The temperatures $Tp$ and $Te$ are measured and introduced, manually or automatically, into two elements of the machine respectively, these elements being a workpiece corrector CP and a standard corrector CE. The reference temperature $Tr$ is also introduced into the two correctors and the coefficient of thermal expansion $ap$ of the workpiece and the coefficient of thermal expansion $ae$ of the standard are also respectively introduced into the correctors CP and CE.

The data furnished by the two correctors passes to a differential element of the machine denoted by reference D. Data furnished by the corrector CP is a function of $ap(Tr-Tp)$, and data furnished by the corrector CE is a function of $ae(Tr-Te)$. The differential element D supplies to a compensating element K a signal formed by the difference $ap(Tr-Tp)-ae(Tr-Te)$. The compensator K receives a second signal constituted by the length $Lp$ of the workpiece, which may be compared with the length $Lo$ of the workpiece at the reference temperature, the second order error being negligible. Compensator K modifies the reading on the standard by the value $\Delta L$ so that at the temperature $Te$ of the standard this reading is identical to that of $Lo$ at the reference temperature $Tr$.

Figure 6:
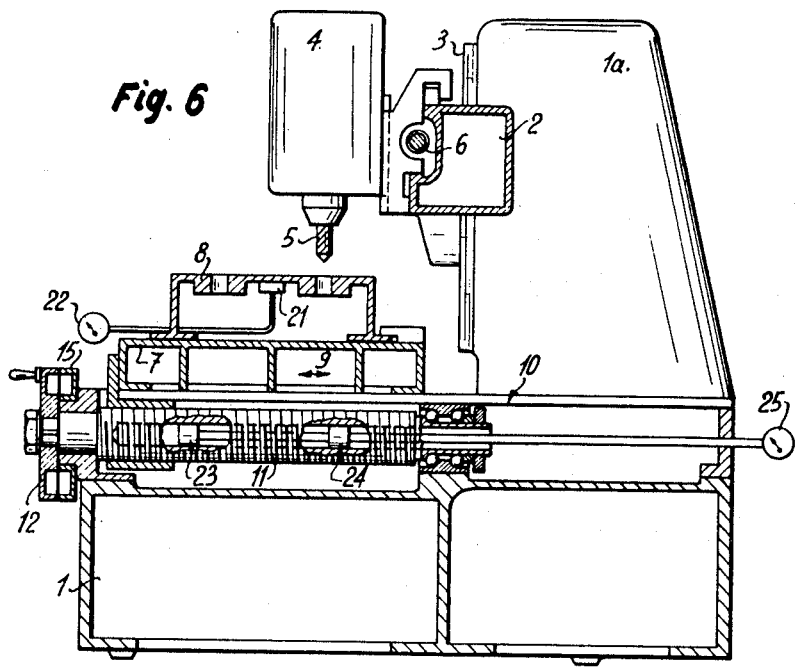
FIG. 6 is a vertical section of a jig boring machine in which compensation of the temperature variations is effected manually, only the parts necessary to an understanding of the invention having been shown.

The jig boring machine shown in FIG. 6 comprises a frame 1 having two uprights 1a, only one of which is shown in the drawing, and these uprights carry a horizontal cross-member 2 adapted to move vertically on two slide guides 3 provided on the uprights 1a. The cross-member 2 carries a head 4 provided with a tool 5 which, in the example illustrated, is a boring tool. The head 4 moves horizontally along the cross-member 2 under the control of a screw 6.

The machine further comprises a table 7 for supporting a workpiece 8, the table being movable in the direction of the arrow 9 on a slide guide 10 provided on the top surface of the frame. Movements of the table 7 are manually controlled by means of a lead screw 11 rotatably mounted on the frame and connected to a control wheel 12. The latter bears a graduated scale 13 (FIG. 7) which moves with respect to an index 14. The index is provided on a drum 15 mounted on the frame 1 coaxially with the lead screw 11 and control wheel 12.

Drum 15 may be moved angularly and to this end has an arm 15a which by means of a compression spring 16 is held in contact with a control lever 17 connected to a rod 18 rotatably supported by bearings 1b of the frame. Rod 18 carries a feeler 19 which contacts a correcting cam 20. Cam 20 is substantially rectilinear and the profile of the cam is designed in dependence on the irregularities of the lead screw 11. The cam which moves with table 7 actuates drum 15 to modify the position of the index 14 depending upon the irregularities of the lead screw 11 and thus compensate for these irregularities.

The machine illustrated comprises a device for compensation of the effects of thermal expansion of the workpiece 8 and the lead screw 11, which lead screw is in this case the standard. In this respect, workpiece 8 is provided with a temperature detector 21 comprising a thermocouple which actuates a temperature indicator 22 positioned as illustrated in FIG. 6. The lead screw is provided with two temperature detectors 23 and 24 which are also formed by thermocouples which actuate a temperature indicator 25. Indicator 25 indicates the mean temperature of the lead screw 11 which, as a result of its length, may have different temperatures at its two ends.

With reference to FIGS. 8 to 13, one of the side faces of the table 7 carries a bracket 26 which forms a slide guide for two slides 27 and 28. An upper part 29 of each slide has a rack 30 meshing with a pinion 31 carried by a spindle 32 rotatably supported by bracket 26 and table 7. Each spindle 32 carries a control knob 34 which is connected thereto by means of a key 33, the knob 34 having a toothed edge 35 meshing with a toothed edge 36 formed in a boss 37a of a cover 37 carried by the table 7. It is only necessary to move a knob 34 axially outward on its spindle 32, against a return spring 38, to enable the spindle 32 to be rotated whereby the corresponding slide is moved along the slide guide 26. Each knob 34 bears a graduation 39 calibrated in temperature units, the graduation moving with respect to a fixed index 40 marked on the boss 37a of the cover 37.

The slide 27 carries a part 41 which is pivotally mounted thereon by a spindle 42, and which part forms an inclined plane of adjustable slope. The spindle 42 is pivotally mounted in the slide 27 and is provided with a control knob 43 which is mounted thereon in the same way as the knob 34 is mounted on the spindle 32. The hub of knob 43 bears a graduation 44 calibrated in units of coefficient of thermal expansion, and the graduation is adapted to move with respect to a fixed index 45 carried by a sleeve 46 connected to the slide 27. The slide 28 has an inclined plane 47.

Figure 8:
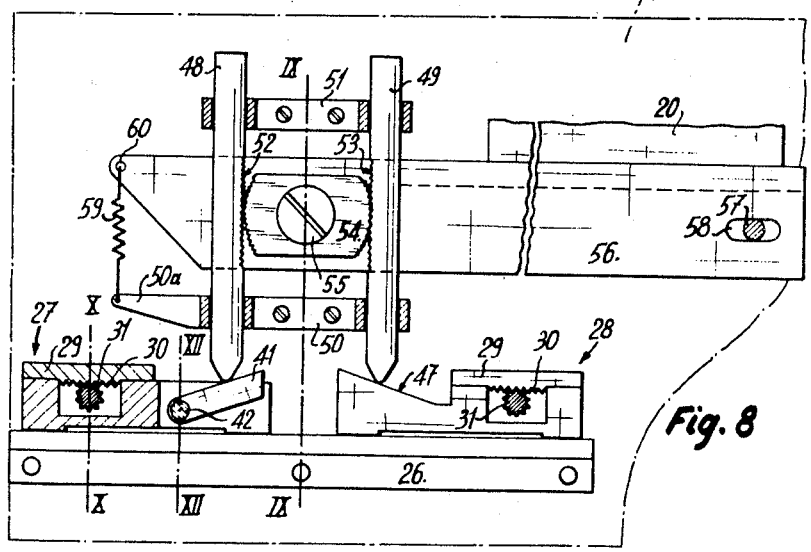
FIG. 8 is an elevation in partial section forwardly of FIG. 6 of said machine.

The two inclined planes 41 and 47 respectively cooperate with two feelers 48 and 49 sliding in guide parts 50 and 51 carried by the table 7 (FIGS. 8 and 9). The two feelers have toothing 52 and 53, respectively, which constitute a rack meshing with a gear 54 mounted loosely on a pivot pin 55 which is fixed on a bar 56 pivotally mounted on the table 7 at 57 and carrying the cam 20. It should be noted that the spindle 57 of the bar 56 passes through a slot 58 in the latter to enable the opposite end of the bar starting from the pivot pin 55 to move with a rectilinear translatory movement parallel to the feelers 48 and 49. The bar 56 is subject to the return action of a spring 59 which is hooked at one end 60 to the bar and at the other end to the end 50a of the guide part 50.

The machine described operates as follows:

By operation of the control knob 43 the slope of the inclined part 41 is adjusted according to the coefficient of thermal expansion of the material from which the workpiece 8 is made. It should be noted that the slope of the inclined plane 47 is not adjustable and has been designed according to the coefficient of thermal expansion of the lead screw 11 which forms the standard.

The temperature of the workpiece is read from thermometer 22 and is then transferred to the scale 39 by operating control knob 34 of slide 27. The same operation is carried out with the mean temperature of the lead screw by reading the temperature from the thermometer 25, and adjusting the position of the slide 28 accordingly. As a result of these different operations the axial positions of the feelers 48 and 49 are functions of the thermal coefficient and of the temperature of the workpiece and the standard, respectively. Together with the gearwheel 54 these two feelers constitute a differential mechanism wherein the position of the pivot pin 55 on which the gearwheel is mounted is a function of the difference of the positions of the feelers. Vertical movements of the pivot pin 55 have the effect of modifying the inclination of the bar 56. The slight longitudinal displacements of the bar 56 are sufficiently small to be disregarded in their effect; nevertheless, the cam 20 could be slidably mounted on the bar 56, a compensation mechanism of the parallelogram type, for example, slightly moving the cam 20 on the bar 56 to compensate for the longitudinal movements of the latter. The bar 56 could also be pivoted at 57 about a fixed point and the slot could be provided in the opposite end of the bar; the pivot pin 55 would then be mounted on a slide moving in said slot.

Since, as was seen previously, the cam 20 acts on the drum 15 to move the index 14, with respect to which the graduation 13 on the wheel 12 controlling the lead screw 11 moves, the position of the lead screw is a function of the temperatures and coefficients of thermal expansion of the workpiece and of the standard.

In the embodiment shown in FIGS. 14 and 15, the position of the table, denoted by reference 61, is not checked by reading the angular position of the lead screw as in the first embodiment, but by reading a graduated rule 62 carried by the table and moving with respect to a lens 63 (FIG. 15). The graduation of the rule 62 is illuminated by a light source 64 through a semi-transparent mirror 65. The image of the graduation is reflected by this mirror 65 and by a second mirror 66 on to a screen 67 on which this image appears on an enlarged scale with respect to a fixed index 68 shown diagrammatically in FIG. 14. The mirror 66 is adapted to swivel since it is carried by two pivot pins 69 rotatably mounted in two bearings 1c provided on the machine frame.

The table 61 carries a compensating cam 70 intended to correct the errors in the graduation of the rule 62. Cam 70 is similar to cam 20 in the first embodiment, is pivoted at 71, and the inclination of the cam is variable, being controlled by a differential mechanism identical to that in the first embodiment, as shown diagrammatically in FIG. 14, in which the feelers 48 and 49 and the gearwheel 54 can be seen. Cam 70 acts through a thrust element 72 slidably mounted in a part 1d of frame 1 upon a lever 73 carried by one of the pivot pins 69 of the mirror 66. Thus, movements of mirror 66 which result in movements of the image of the rule 62 on the screen 67 are controlled by the differential mechanism, which in turn is controlled by the temperature and coefficients of thermal expansion of the workpiece and the lead screw.

The embodiments described hereinbefore are of the manually controlled type inasmuch as the temperatures of the workpiece and of the standard read off from the thermometers 22 and 25, respectively, have to be transferred manually to the scale 39 to enable the position of the slides 27 and 28 to be adjusted. In the embodiments in FIGS. 16 and 17 the control is automatic. In these figures, only the parts of the machine differing from the first embodiments have been shown.

The compensation cam 74, corresponding to the compensation cams 20 and 70 of the previous embodiments, is carried by a bar 75 pivoted at 76 on the machine table 7. The angular movements of the bar 75 are controlled by a two-phase electric motor 77 mounted on machine table 7, and the shaft 78 of the motor carries a worm 79 meshing with a gear 80. Gear 80 is mounted on a shaft 81 which is supported for rotation by bearings 7a of the table and carries a gear 82 meshing with a toothed sector 83 formed on the end of the bar 75 opposite the end where it is pivoted.

In this embodiment, the differential device is formed by the electric control circuit of the motor 77. To this end, an A.C. generator 84 feeds the motor 77 through a Wheatstone bridge 85, the two parts 85a and 85b of which each contain a transformer, 86 and 87, respectively. The primary winding 88 of the transformer 86 is fed by two thermocouples 89 and 90 connected in series and forming the temperature detectors for the lead screw (not shown in this embodiment). The primary winding 88 of the transformer 86 has a number of input terminals 91 with which a manually movable switch 92 cooperates.

Similarly, the primary winding 93 of the transformer 87 is fed by a thermocouple 94 forming the temperature detector for the workpiece (not shown). This winding 93 also has a plurality of input terminals 95 with which a manually movable switch 96 cooperates.

As variant, the thermocouples 89, 90 and 94 could be replaced by thermistors, the windings 88 and 93 then each being fed by a current source connected in series with the thermistors.

In this embodiment, the only manual operation required is to vary the transformer ratios by adjusting the switch 92 depending upon the coefficient of thermal expansion of the standard, and the switch 96 according to the coefficient of thermal expansion of the workpiece. The temperatures of the workpiece and of the standard act automatically upon the Wheatstone bridge 85 through the transformers 87 and 86, respectively, which controls the motor 77 through an amplifier 97.

It should be noted that the machine is provided with a control device formed by a potentiometer 98, the slider 99 of which is actuated by the shaft 81. The winding of the potentiometer 98 is connected directly to the generator 84 by way of terminals 100 and 101.

The electric control circuit for motor 77 is as follows: one phase of the motor is connected directly to the generator 84 while the other phase is connected to amplifier 97, the latter being supplied by the Wheatstone bridge 85 through the control device.

In all the embodiments described hereinbefore, the factor $Lp \cong Lo$ is reintroduced into the compensator, as shown diagrammatically in FIG. 5, by the fact that the compensation cam 20, 70, or 74 moves wtih respect to the feeler 19 or 72 as the table advances. It follows from this that the distance between the point where the feeler makes contact with the rule and the pivot axis of the rule varies with the movements of the table, i.e., with the length measured, and the effect of the movements of the rule in turn varies with this distance.

In the embodiment shown in FIG. 17, which is a variant of the embodiment shown in FIG. 16, the shaft 81 does not control a compensation cam of the same kind as the cams 20, 70 or 74 in the previous embodiments, but controls a circular cam 102 acting directly on the lever 15a of the drum 15 carrying the reference index 14 for the position of the lead screw 11.

In order to introduce the "length of measurement" factor into the compensation, the control potentiometer winding 98 is not connected directly to the terminals 100 and 101 as in the embodiment in FIG. 17, but is connected through a transformer 103, the winding 104 of which is tapped by means of a slider 105 so that the transformer ratio is variable. The slider is moved by the movable table so that variations in the transformer ratio are a function of the length measured.

It should be pointed out that in the case of a measuring machine the borer 5 of the jig boring machine illustrated in FIG. 6 can be simply replaced by a feeler. Moreover, in the case of a measuring machine which does not undergo any heating arising from machining, the temperature of the standard could be compared with that of the premises in which the machine is disposed. In that case, the detectors 23 and 24 would not be placed in the lead screw but simply in the measuring room. A single detector would also be sufficient.

I claim:

1. A measuring machine, comprising a movable element, and a device for linear measurement of the positions occupied by said movable element along its path, said device including a linear reference element serving as a standard, at least two temperature detectors to provide information concerning the temperatures of a workpiece and of the standard, a differential device, means to adjust said differential device in accordance with the information provided by said temperature detectors and the coefficients of thermal expansion of the workpiece and said standard, said differential device including a member adapted to be displaced in accordance with said adjustments, the amount of displacement being a function of the temperatures and coefficients of expansion of both the workpiece and standard, and indicating means controlled by displacement of said member of the differential device to indicate the real values of the movements of said movable element, reduced to a reference temperature even when the temperature of the workpiece and of the standard differ therefrom.

2. A machine according to claim 1, characterized in that the differential device comprises a rotary gear mounted on said member, and two axially movable racks which mesh with the said gear, the axial movements of said racks being adapted to displace said gear and impart said displacement to said member.

3. A machine according to claim 2, wherein said means to adjust said differential device includes two laterally movable inclined planes acting upon said racks, the respective slopes of which planes are functions of the coefficients of expansion of the workpiece and the standard and lateral displacements of which planes are functions of the information provided by the detectors of the temperature of the workpiece and standard, respectively.

4. A machine according to claim 3, wherein at least one of the inclined planes has an adjustable slope.

5. A machine according to claim 4, wherein a manual control device having a graduated scale calibrated in coefficient of thermal expansion units is provided for adjusting the slope of said one of the inclined planes.

6. A machine according to claim 3, wherein a manual control device having a graduated scale calibrated in temperature units is provided for adjusting the lateral displacement of each inclined plane.

7. A machine according to claim 1, characterized in that the differential device comprises an electrical control circuit including a motor for actuating said displaceable member, and a Wheatstone bridge, said bridge including two transformers having primary windings connected in series with said temperature detectors.

8. A machine according to claim 7, characterized in that the primary winding of at least one of said transformers contains a plurality of input terminals, whereby the transformer ratio can be varied in accordance with a given coefficient of thermal expansion.

9. A machine according to claim 7, characterized in that it comprises a control device connected in the output circuit of the bridge for determining the positions in which the member controlled by the motor stops.

10. A machine according to claim 9, characterized in that said control device is connected to the motor supply circuit through a transformer having a variable transformer ratio, the variations of the transformer ratio being controlled by the linear displacements of said movable element.

11. A machine according to claim 1, wherein said standard is a lead screw for moving said movable element, said lead screw having a scale for checking the positions of said lead screw relative to a reference mark, and wherein said indicating means includes a movable component provided with said reference mark.

12. A machine according to claim 11, and a cam for compensating irregularities in the lead screw, said cam being actuated by displacement of said member of the differential device and operating to move said movable component of the indicating means in response to displacement of said member.

13. A machine according to claim 1, wherein said indicating means includes an optical device comprising an illuminated graduated rule, a screen having a reference mark, and a movable reflector for projecting an image of said scale on to the screen for comparison with said reference mark, and said machine comprising means for moving said reflector in response to displacement of said member of the differential device whereby the position of the image on the screen is moved relative to the reference mark.

14. A machine according to claim 1, wherein the temperature detector for the standard is disposed in the room in which the machine is situated.

References Cited in the file of this patent

UNITED STATES PATENTS

| | | |
|---|---|---|
| 2,956,344 | Rantsch | Oct. 18, 1960 |
| 2,995,826 | Brault | Aug. 15, 1961 |

FOREIGN PATENTS

| | | |
|---|---|---|
| 1,221,417 | France | Jan. 11, 1960 |